US012794073B1

(12) United States Patent
Bots

(10) Patent No.: US 12,794,073 B1
(45) Date of Patent: Nov. 10, 2026

(54) BATTERY WITH PRESSURE RELEASE SAFETY FEATURE

(71) Applicant: Brunswick Corporation, Mettawa, IL (US)

(72) Inventor: Harrie Bots, Rotterdam (NL)

(73) Assignee: Brunswick Corporation, Mettawa, IL (US)

(*) Notice: Subject to any disclaimer, the term of this patent is extended or adjusted under 35 U.S.C. 154(b) by 881 days.

(21) Appl. No.: 17/851,993

(22) Filed: Jun. 28, 2022

Related U.S. Application Data

(60) Provisional application No. 63/217,916, filed on Jul. 2, 2021.

(51) Int. Cl.
*H01M 50/325* (2021.01)
*H01M 50/147* (2021.01)
*H01M 50/193* (2021.01)

(52) U.S. Cl.
CPC ....... *H01M 50/325* (2021.01); *H01M 50/147* (2021.01); *H01M 50/193* (2021.01)

(58) Field of Classification Search
CPC . H01M 50/325; H01M 50/193; H01M 50/147
See application file for complete search history.

(56) References Cited

U.S. PATENT DOCUMENTS

| | | | |
|---|---|---|---|
| 4,965,144 | A | 10/1990 | Ng et al. |
| 7,678,492 | B2 | 3/2010 | Schulte-Ladbeck |
| 7,951,474 | B2 | 5/2011 | Schembri et al. |
| 8,003,242 | B2 | 8/2011 | Puhlick et al. |
| 9,508,970 | B2 | 11/2016 | Jones et al. |
| 10,529,969 | B2 | 1/2020 | Ogawa et al. |
| 2003/0215698 | A1 * | 11/2003 | Schulte-Ladbeck ........................ H01M 50/147 429/86 |
| 2014/0127537 | A1 | 5/2014 | Pflueger et al. |
| 2021/0127511 | A1 | 4/2021 | Schulz et al. |

FOREIGN PATENT DOCUMENTS

| | | |
|---|---|---|
| WO | 2017/072697 | 5/2017 |
| WO | 2018/209282 | 11/2018 |

* cited by examiner

*Primary Examiner* — Lingwen R Zeng
(74) *Attorney, Agent, or Firm* — Andrus Intellectual Property Law, LLP

(57) ABSTRACT

A battery system is provided. The battery system includes at least one battery cell, a main enclosure, and an enclosure cover having a cover vent and an access port recess formed therein. The enclosure cover is configured to be detachably coupled to the main enclosure such that the main enclosure and the enclosure cover define an interior battery region that houses the at least one battery cell. The battery system further includes an access cover configured to be located over the access port recess, and a sealing element positioned between the enclosure cover and the access cover. The sealing element is configured to deform toward the cover vent to permit a flow of gasses to escape the interior battery region through the cover vent when a pressure safety threshold is exceeded.

20 Claims, 6 Drawing Sheets

BATTERY WITH PRESSURE RELEASE SAFETY FEATURE

CROSS-REFERENCE TO RELATED APPLICATION

The present application claims priority of U.S. Provisional Patent Application No. 63/217,916, filed Jul. 2, 2021, the content of which is incorporated herein by reference in its entirety.

FIELD

The present disclosure relates to battery systems, and particularly to systems for safely relieving pressure within a Lithium-ion (LI) battery.

BACKGROUND

Pressure management is crucial to the proper functioning of LI batteries. During normal operation of a LI battery, the temperature within the battery increases and the battery cells expand, thereby increasing the pressure within the battery. Thermal runaway in LI batteries involves a chain of exothermic reactions in which current flowing through the battery causes the battery temperature to rise, which in turn increases the current with a further rise in temperature. If the pressure increase associated with thermal runaway conditions is not accommodated by the battery enclosure, the battery can fail catastrophically and endanger the vessel, vehicle, or appliance in which it is installed.

BRIEF DESCRIPTION OF THE DRAWINGS

The present disclosure is described with reference to the following Figures. The same numbers are used throughout the Figures to reference like features and like components.

SUMMARY

Figure 1:
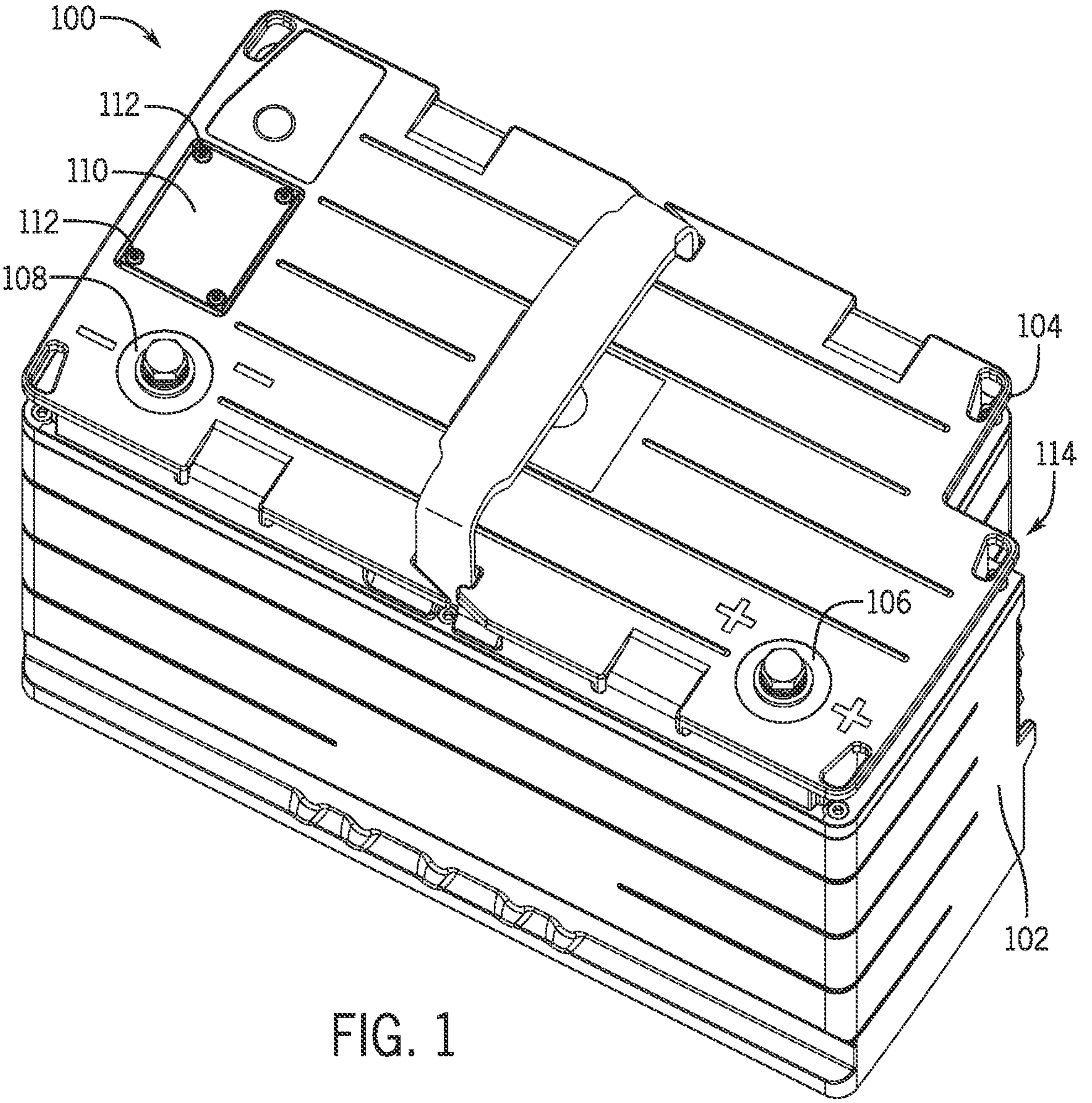
FIG. 1 is a perspective view of an LI battery with pressure relief features according to an exemplary implementation of the present disclosure.

According to one embodiment of the present disclosure, a battery system is provided. The battery system includes at least one battery cell, a main enclosure, and an enclosure cover having a cover vent and an access port recess formed therein. The enclosure cover is configured to be detachably coupled to the main enclosure such that the main enclosure and the enclosure cover define an interior battery region that houses the at least one battery cell. The battery system further includes an access cover configured to be located over the access port recess, and a sealing element positioned between the enclosure cover and the access cover. The sealing element is configured to deform toward the cover vent to permit a flow of gasses to escape the interior battery region through the cover vent when a pressure safety threshold is exceeded.

According to another embodiment of the present disclosure, a pressure valve system for a device enclosure is provided. The pressure valve system includes a first cover component having a cover vent and a recess formed therein. The recess further includes an opening that is partially surrounded by an inner peripheral wall and an outer peripheral wall. The pressure valve system further includes a second cover component configured to be located over the recess and detachably coupled to the first cover component, and a sealing element positioned between the first cover component and the second cover component in a first direction, and between the inner peripheral wall and the outer peripheral wall in a second direction. The first direction is different from the second direction. The sealing element is configured to deform toward the cover vent when a pressure safety threshold in the device enclosure is exceeded.

DETAILED DESCRIPTION

In the present description, certain terms have been used for brevity, clearness and understanding. No unnecessary limitations are to be inferred therefrom beyond the requirement of the prior art because such terms are used for descriptive purposes only and are intended to be broadly construed.

Existing solutions for venting excess pressure from LI battery enclosures or other powered devices that include LI batteries have significant disadvantages. Some valve assemblies incorporate spring mechanisms that bias valve elements into closed positions such that when a pressure threshold is exceeded within the enclosure, the spring mechanism is compressed and the valve element is opened. These valve assemblies are effective, but are often expensive and contain many parts, adding to the complexity of the battery enclosure. Other valve assemblies utilize vent cover materials that are designed to fail catastrophically via a pin component that breaks the vent cover material and thus provides a flow passage for gases when a pressure threshold is exceeded. Such assemblies are often simpler and cheaper than valves that utilize spring mechanisms, but can only be used once and must be repaired or replaced after an event in which a pressure threshold is exceeded.

LI batteries utilized in wet or humid environments, for example, marine batteries utilized on marine vessels, often incorporate sealing elements into the battery enclosure design to prevent water ingress. The present inventor has recognized that simple and effective pressure venting for a battery enclosure or the like may be achieved by modifying sealing arrangements already incorporated into the enclosure design, thus avoiding the need for additional valve assemblies that add complexity and cost to the enclosure design. In addition, the modifications to the sealing arrangements embodied in the invention disclosed herein do not damage any sealing element when pressure release occurs, thus avoiding the need for replacement or repair inherent to the one-time use valve assemblies.

FIG. 1 depicts a LI battery system 100, according to an exemplary implementation of the present disclosure. The battery system 100 is shown to include a main enclosure 102 and an enclosure cover 104. The enclosure cover 104 is detachably coupled to the main enclosure 102 using any suitable fasteners. In various embodiments, the main enclosure 102 and the enclosure cover 104 may be fabricated from a metal (e.g., aluminum or aluminum alloy, steel), plastic, or composite material.

The enclosure cover 104 is further shown to include a positive terminal 106 and a negative terminal 108. A battery cell or cells (not shown) may be positioned within the main enclosure 102 and enclosure cover 104. The cells include all the typical components of a battery cell, namely, a cathode which is coupled to the positive terminal 106, an anode which is coupled to the negative terminal 108, an electrolyte, and a separator. In an exemplary implementation, the battery cell includes intercalated lithium compound utilized as the cathodic material and graphite utilized as the anodic material.

An access cover 110 is shown to be located within a recess formed in the enclosure cover 104. In an exemplary implementation, the access cover 110 is fabricated from a transparent material (e.g., acrylic) such that internal battery components beneath the access cover 110 are visible. For example, colored LEDs indicating the health of the battery 100 may be positioned beneath and visible to an operator through the access cover 110. In some implementations, DIP switches (not shown) controlling various parameters of the battery 100 may also be positioned below the access cover 110. Accordingly, the access cover 110 may be detachably coupled to the enclosure cover 104 using multiple fasteners 112 such that removal of the fasteners 112 permits removal of the cover 110 and access to the DIP switches.

In an exemplary implementation, the interior volume of the battery system 100 defined by the main enclosure 102 and the enclosure cover 104 is not fully sealed to the environment. Instead, a vent opening (described in further detail below) may be formed in the enclosure cover 104 below an upper flange 114. The vent opening may include a membrane that permits the passage of gases into or out of the interior volume while preventing the incursion of water into the interior volume. In further implementations, the main enclosure 102 and enclosure cover 104 may form a sealed volume for the battery cell or cells. Gasket material may be located between the main enclosure 102 and the enclosure cover 104. If the battery 100 includes a sealed interior volume, the battery 100 may include a pressure relief valve in addition to the pressure relief features depicted and described with reference to FIGS. 2-6 below. The pressure relief valve is configured to remain closed under nominal conditions and to open to vent air from within the sealed interior volume if a pressure safety threshold within the volume is exceeded.

Figure 2:
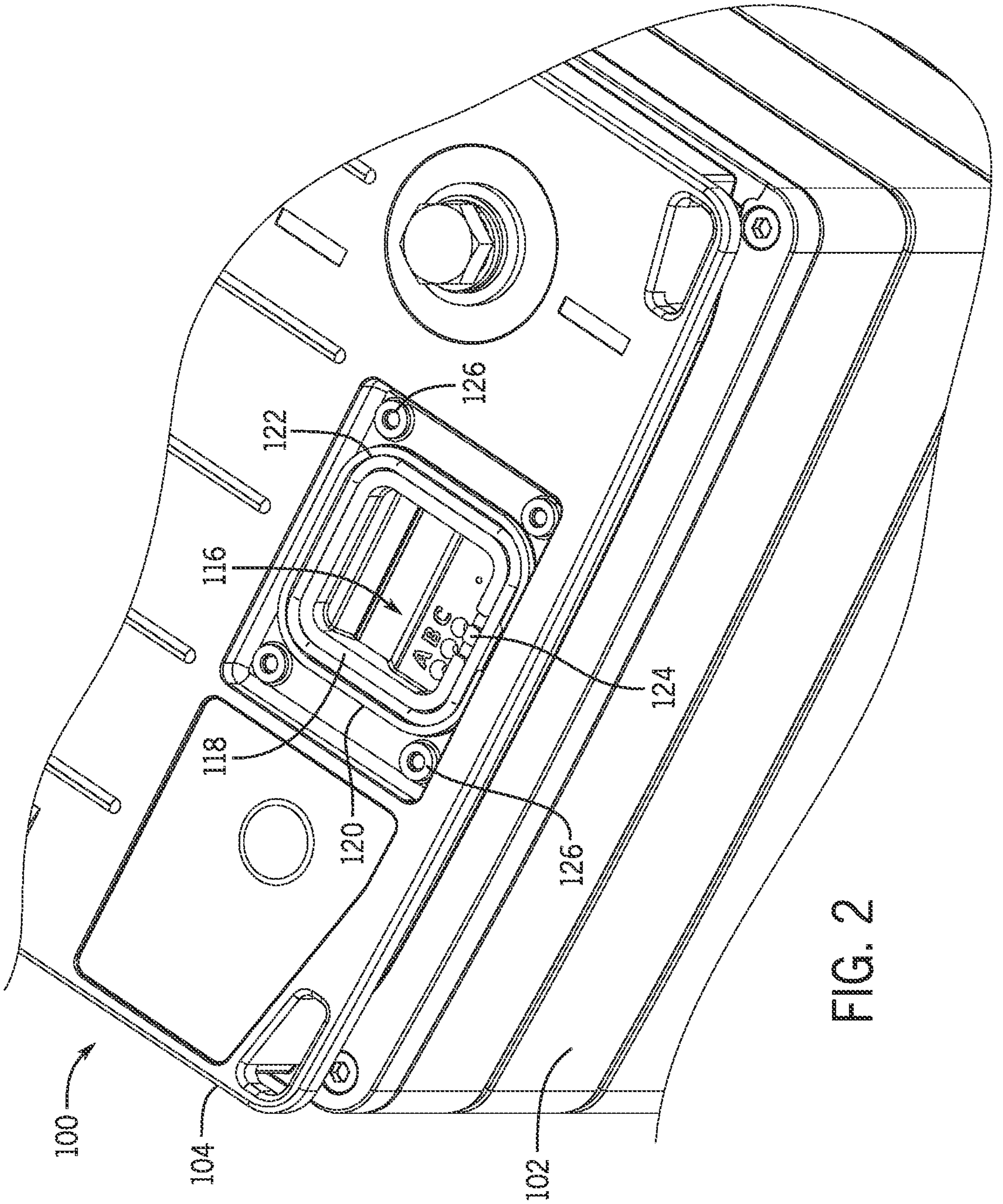
FIG. 2 is a detail view depicting the pressure relief features in the LI battery of FIG. 1.
Figure 3:
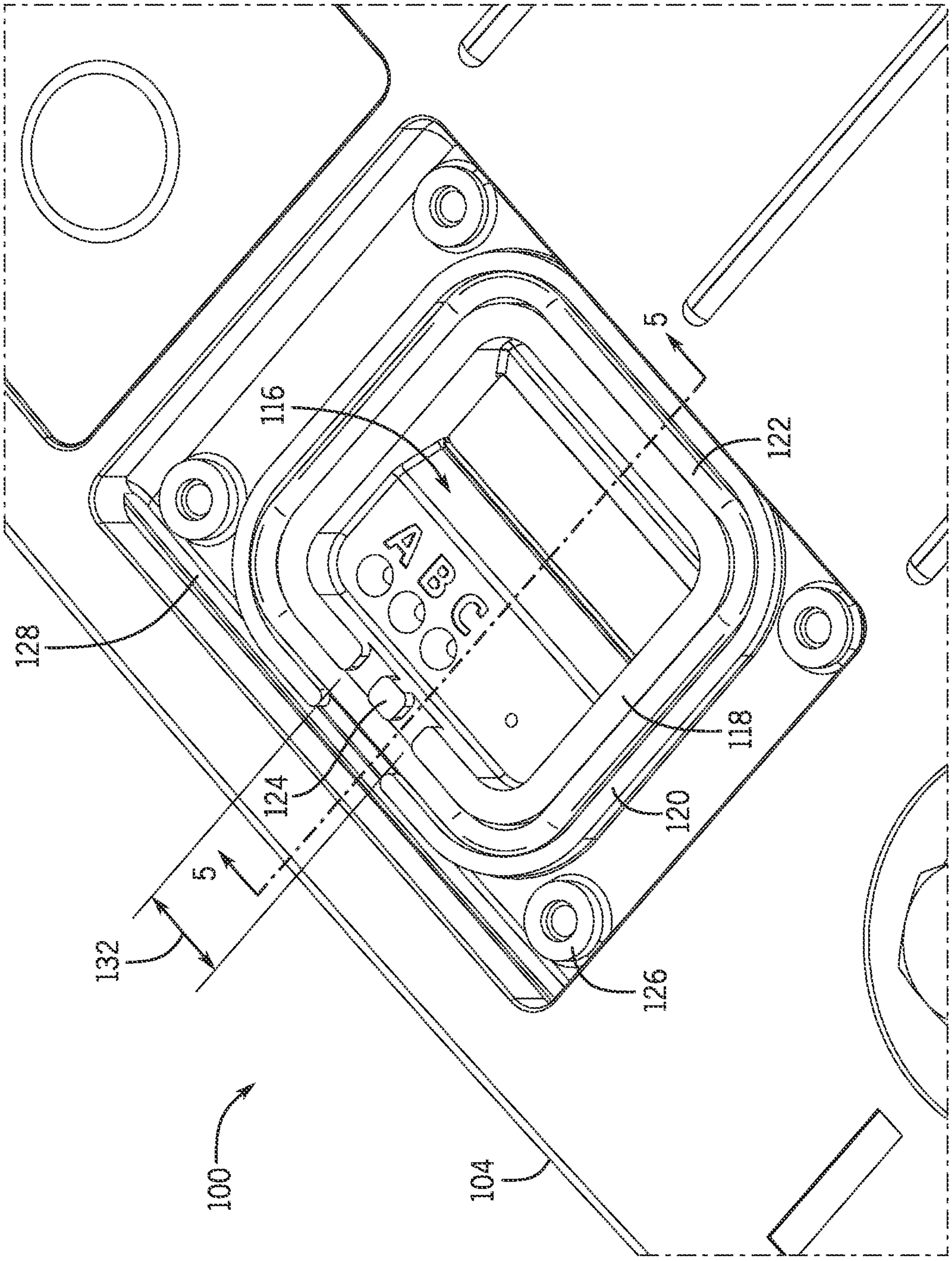
FIG. 3 is another detail view depicting the pressure relief features in the LI battery of FIG. 1.
Figure 4:
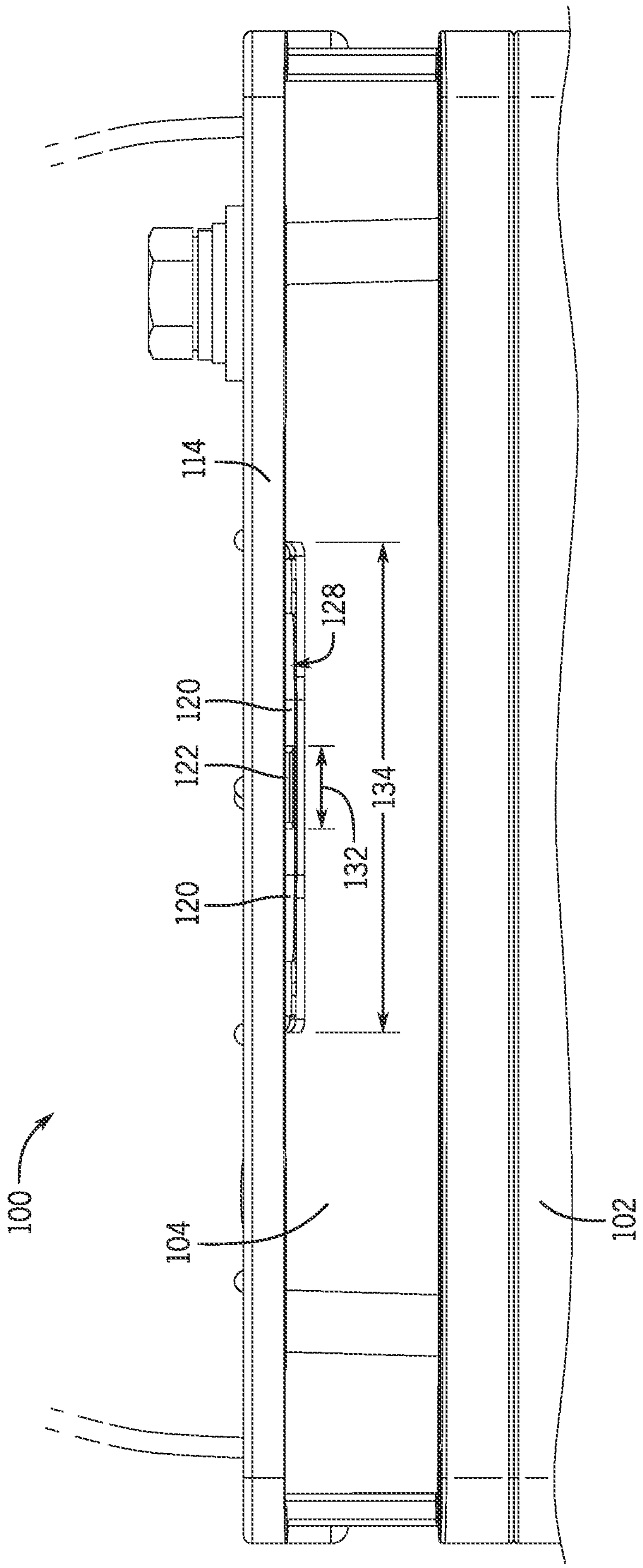
FIG. 4 is a side detail view depicting the pressure relief features in the LI battery of FIG. 1.
Figure 5:
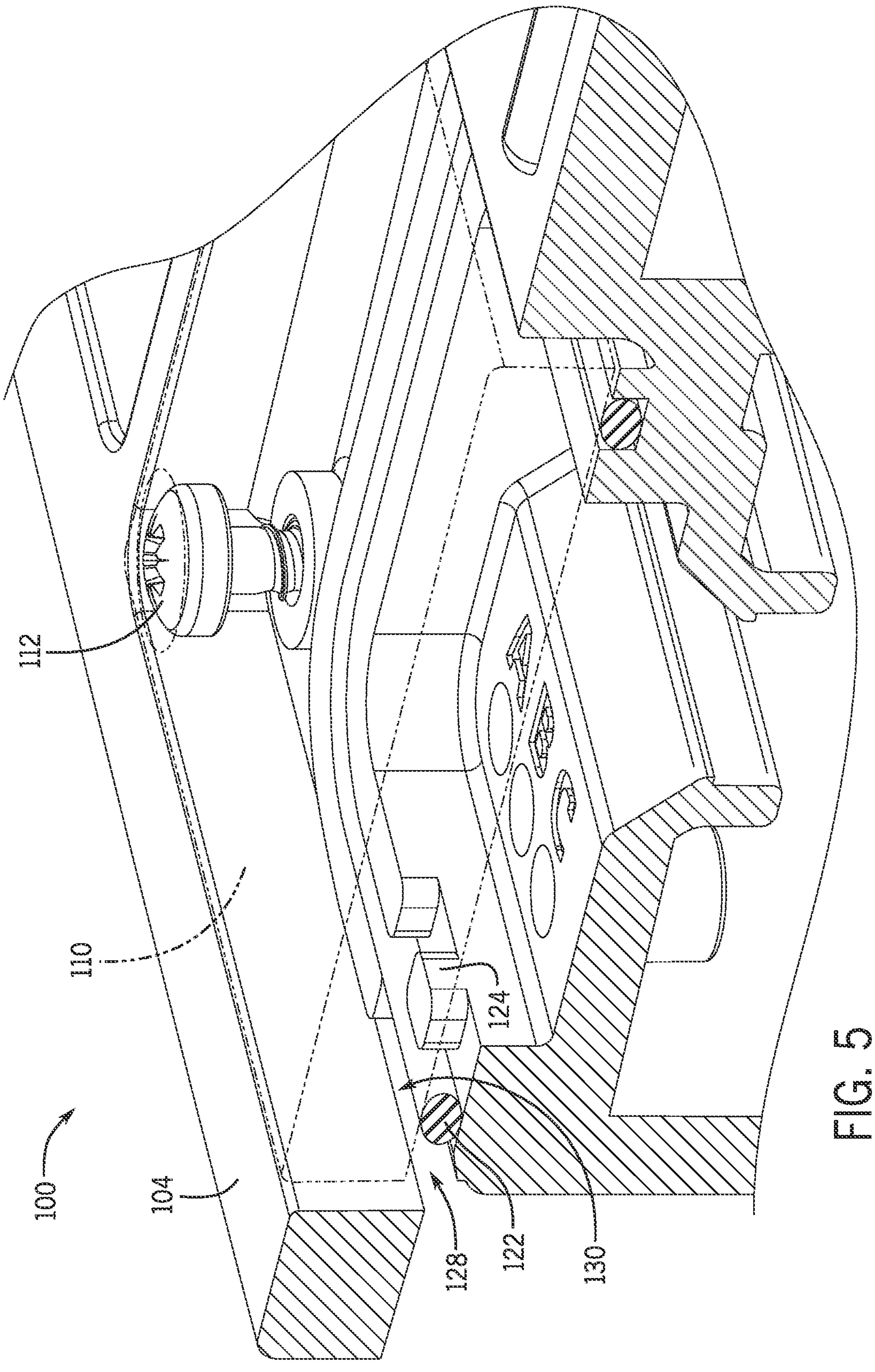
FIG. 5 is a cross-sectional view taken along the line 5-5 of FIG. 3.

Referring now to FIGS. 2-6, detail and cross-sectional views of the pressure relief features of the battery system 100 are depicted. FIGS. 2 and 3 depict the battery system 100 with the access cover 110 removed, exposing an interior battery region 116. FIG. 4 depicts a side view of the battery system 100 including a vent opening 128 positioned below upper flange 114 that permits escape of gases from the interior battery region 116. By positioning the vent opening 128 below the upper flange 114, the vent opening 128 is protected against water intrusion when the battery system 100 is operated in a wet environment (e.g., on a marine vessel). FIG. 5 depicts the transparent access cover 110 as coupled to the enclosure cover 104 using fasteners 112 (e.g., screws). The fasteners 112 are shown to be received by bosses 126 with threaded holes that surround the interior battery region 116.

As specifically depicted in FIGS. 2 and 3, the interior battery region 116 is bound by an inner peripheral wall 118 and an outer peripheral wall 120. A sealing element 122 is shown to be positioned in a gland formed between the inner peripheral wall 118 and the outer peripheral wall 120. Under nominal pressure conditions within the battery 100, the sealing element 122 is configured to be compressed in a vertical direction when the access cover 110 is coupled to the enclosure cover 104, thereby blocking the passage of air and/or fluid between the access cover 110 and the interior battery region 116.

In an exemplary implementation, the sealing element 122 is an O-ring with a circular cross section, as depicted in FIGS. 2-3. When compressed by the access cover 110, the cross-section may be generally oval-shaped, as is depicted in FIG. 5. In other implementations, the sealing element 122 may be a gasket with a non-circular cross section (e.g., square, rectangular). The sealing element 122 may be fabricated from any elastomeric material that exhibits desired sealing characteristics (e.g., hardness, tensile strength, compression set). For example, the material for the sealing element 122 may include, but is not limited to: closed cell rubber, silicone, nitrile, butyl, and neoprene. A typical LI battery for a marine vessel application may include a nitrile butadiene rubber (NBR) Shore A value 50 O-ring with an inner diameter of 38 mm and a cross-sectional diameter of 2 mm.

Figure 6:
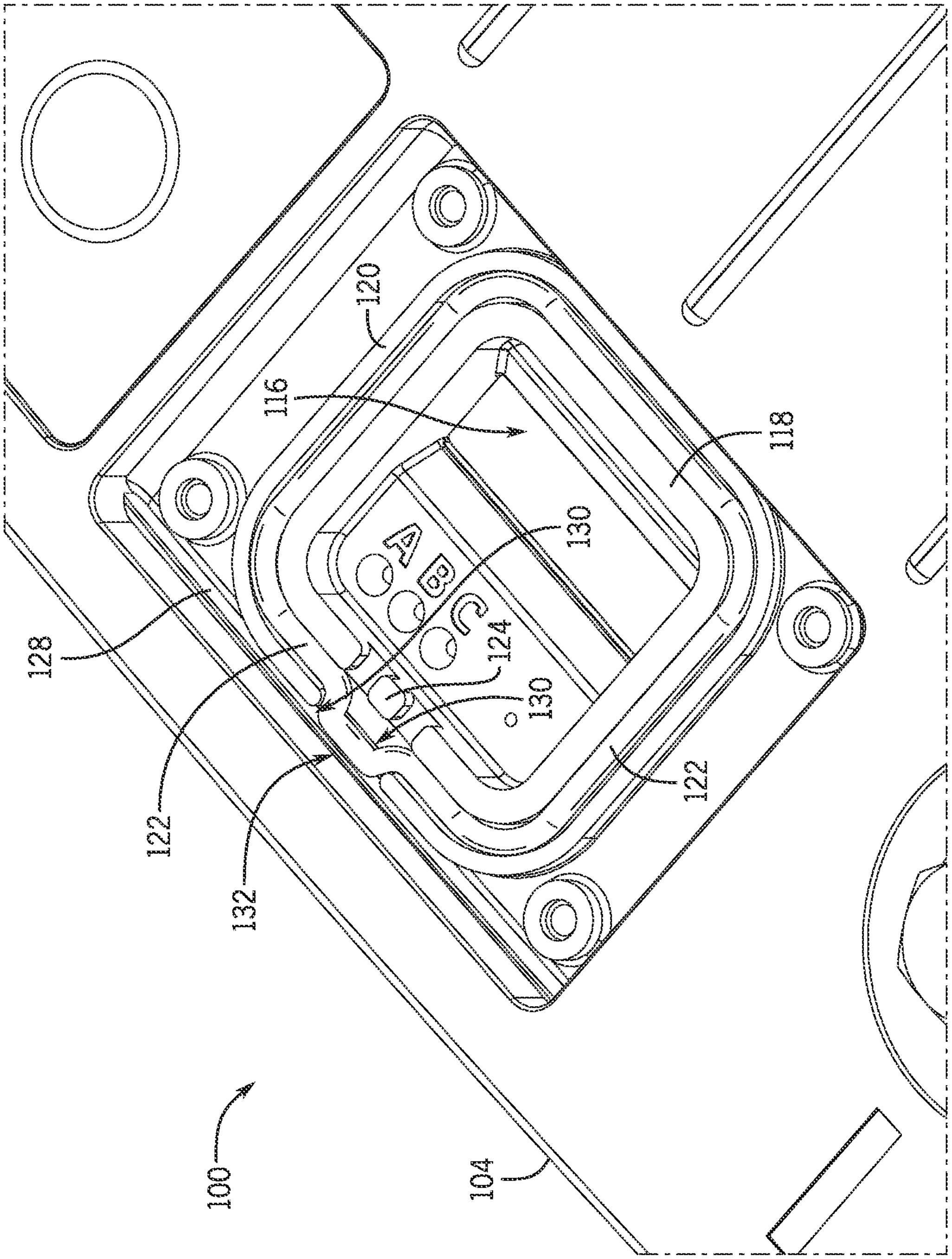
FIG. 6 is another detail view depicting the pressure relief features in the LI battery of FIG. 1 when a pressure threshold is exceeded.

The inner peripheral wall 118 and the outer peripheral wall 120 do not form a continuous barrier around the sealing element 122. Rather, as best depicted in FIGS. 3, 4 and 6, each of the walls 118, 120 includes a gap region 132 proximate a cover vent opening 128. The length 134 of the vent opening 128 (see FIG. 4) may generally correspond to the length of the access cover 110. In the event of pressure buildup within the battery volume that exceeds a predetermined threshold and threatens the health of the battery 100, the sealing element 122 is configured to bulge outwardly toward the vent opening 128 (see FIG. 6), thus permitting gases from within the battery region 116 to flow through the cover vent 128 as indicated by the arrows 130. In other words, the gap region 132 in the walls 118, 120 acts a designated "weak spot" for the sealing element to "fail" in the event of excessive pressure build up within the battery 100. Once the excess pressure condition is resolved, the sealing element 122 returns to its original position (see FIG. 2), and no damage is incurred to the sealing element 122.

A gap region body 124 is shown to be located in this gap region 132 and aligned with the inner peripheral wall 118 (see FIGS. 3 and 6). The gap region body 124 may act to prevent the sealing element 122 from flexing inwardly to the interior battery region 116 in the event that vacuum conditions are created within the interior battery region 116. In this way, abnormal pressure conditions result in a flow of gases out of the battery 100, but do not result in a flow of gases into the battery 100.

In the present disclosure, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and devices. Various equivalents, alternatives and modifications are possible within the scope of the appended claims.

I claim:

1. A battery system comprising:

at least one battery cell;

a main enclosure;

an enclosure cover having a cover vent and an access port recess formed therein, the enclosure cover configured to be detachably coupled to the main enclosure such that the main enclosure and the enclosure cover define an interior battery region that houses the at least one battery cell;

an access cover configured to be located over the access port recess; and a sealing element positioned between the enclosure cover and the access cover, wherein the sealing element is configured to deform toward the cover vent such that the deformation of the sealing element permits a flow of gases to escape the interior battery region through the cover vent when a pressure safety threshold is exceeded and wherein the sealing element in an undeformed state blocks the flow of gases from the interior battery region.

2. The battery system of claim 1, wherein the sealing element is at least one of the following: 1) an o-ring and 2) fabricated from an elastomeric material.

3. The battery system of claim 1, wherein the sealing element is further configured to return to the undeformed state that blocks the flow of gases through the cover vent after deforming toward the cover vent.

4. The battery system of claim 1, wherein the access cover is coupled to the enclosure cover using a plurality of fasteners, and wherein coupling of the access cover to the enclosure cover compresses the sealing element.

5. The battery system of claim 1, wherein the enclosure cover further comprises an inner peripheral wall and an outer peripheral wall, and wherein the sealing element is further positioned between the inner peripheral wall and the outer peripheral wall such that the outer peripheral wall surrounds a majority of the sealing element.

6. The battery system of claim 5, wherein each of the inner peripheral wall and the outer peripheral wall comprises a gap region, and wherein the outer peripheral wall continuously surrounds the sealing element but for the gap region of the outer peripheral wall.

7. The battery system of claim 6, wherein the sealing element deforming toward the cover vent comprises the sealing element extending into the gap region of the outer peripheral wall.

8. The battery system of claim 6, wherein the enclosure cover further comprises a gap region body positioned in the gap region of the inner peripheral wall, the gap region body configured to prevent the sealing element from deforming into the interior battery region.

9. The battery system of claim 1, wherein the battery system further comprises a plurality of indicator lights mounted in the access port recess and wherein the access cover is fabricated from a transparent material.

10. The battery system of claim 1, wherein the enclosure cover further comprises an upper flange and wherein the cover vent is located below the upper flange.

11. The battery system of claim 1, wherein a length of the access cover is equal to a length of the cover vent.

12. A pressure valve system for a powered device enclosure, the pressure valve system comprising:

a first cover component having a cover vent and a recess formed therein, wherein the recess further includes an opening that is partially surrounded by an inner peripheral wall and an outer peripheral wall;

a second cover component configured to be located over the recess and detachably coupled to the first cover component; and a sealing element positioned between the first cover component and the second cover component in a first direction, and between the inner peripheral wall and the outer peripheral wall in a second direction, wherein the first direction is different from the second direction;

wherein the sealing element is configured to deform toward the cover vent such that the deformation of the sealing element permits a flow of gases to escape the device enclosure through the cover vent when a pressure safety threshold in the device enclosure is exceeded and wherein the sealing element in an underformed state blocks the flow of gases from the device enclosure.

13. The pressure valve system of claim 12, wherein the sealing element is at least one of the following: 1) an o-ring and 2) fabricated from an elastomeric material.

14. The pressure valve system of claim 12, wherein the sealing element is further configured to return to the undeformed state that blocks the flow of gases through the cover vent after deforming toward the cover vent.

15. The pressure valve system of claim 12, wherein the second cover component is coupled to the first cover component using a plurality of fasteners, and wherein coupling of the second cover component to the first cover component compresses the sealing element.

16. The pressure valve system of claim 12, wherein each of the inner peripheral wall and the outer peripheral wall comprises a gap region, and wherein the outer peripheral wall continuously surrounds the sealing element but for the gap region of the outer peripheral wall.

17. The pressure valve system of claim 16, wherein the sealing element deforming toward the cover vent comprises the sealing element extending into the gap region of the outer peripheral wall.

18. The pressure valve system of claim 16, wherein the first cover component further comprises a gap region body positioned in the gap region of the inner peripheral wall, the gap region body configured to prevent the sealing element from deforming in a direction opposite the cover vent.

19. The pressure valve system of claim 12, wherein a length of the second cover component is equal to a length of the cover vent.

20. The pressure valve system of claim 12, wherein the powered device enclosure is a battery enclosure.

* * * * *